United States Patent

[11] 3,618,610

| | | |
|---|---|---|
| [72] | Inventor | Theodore N. Hannant<br>Cedar Grove, N.J. |
| [21] | Appl. No. | 30,910 |
| [22] | Filed | Apr. 22, 1970 |
| [45] | Patented | Nov. 9, 1971 |
| [73] | Assignee | Walter Kidde & Company Inc.<br>Belleville, N.J.<br>Continuation-in-part of application Ser. No. 728,448, May 13, 1968, now abandoned. |

[54] CRYOGENIC SURGICAL APPARATUS
6 Claims, 2 Drawing Figs.

[52] U.S. Cl. ................................................... 128/303.1
[51] Int. Cl. .................................................... A61b 17/36
[50] Field of Search ........................................ 128/303.1, 400; 62/293

[56] References Cited
UNITED STATES PATENTS

| | | | |
|---|---|---|---|
| 3,190,081 | 6/1965 | Pytryga ................ | 128/303.1 UX |
| 3,270,744 | 9/1966 | Katz et al. ............ | 128/303.1 |
| 3,425,417 | 2/1969 | Kanbar et al. ....... | 128/303.1 |
| 3,434,477 | 3/1969 | Thomas ................ | 128/303.1 |

*Primary Examiner*—L. W. Trapp
*Attorney*—Darby & Darby

ABSTRACT: Cryogenic Surgical Apparatus in which a surgical instrument is threaded into an assembly that charges the instrument with refrigerant. The instrument is hollow providing a chamber for holding the refrigerant which cools a metallic tip on the instrument to subzero temperatures. The upper end of the instrument is provided with an annular wall defining a central opening through which the instrument is charged. The charging assembly is provided with a tube which is connected to the refrigerant supply and extends axially into the threaded bore which receives the instrument. The tube is of smaller diameter than the end opening of the instrument and venting ports are provided at the upper end of the instrument receiving bore to allow gases to escape during the charging of the instrument.

PATENTED NOV 9 1971

3,618,610

INVENTOR
THEODORE N. HANNANT

BY
AGENT

CRYOGENIC SURGICAL APPARATUS

CROSS-REFERENCE TO RELATED APPLICATION

This is a continuation-in-part abandoned application Ser. No. 728,448, filed May 13, 1968.

BACKGROUND OF THE INVENTION

Heretofore a cryogenic surgical instrument has been devised which generally comprises an elongate tubular expansion chamber having a tip at its end and an open upper end, a metal probe extending through the tip, and a heat sink on the probe disposed within the chamber. The instrument is used in conjunction with a charging assembly which generally comprises a body to which the instrument is attached for the reception of a cartridge containing a refrigerant gas under pressure, such as dichlorodifluoramethane, and having a passageway extending into the opening of expansion chamber at one end, a hollow pin in the other end of the passageway for piercing the cartridge to release the gas, and a cartridge hold for forcing the cartridge against the pin to pierce the cartridge.

When the expansion chamber is charged, the expanding gas cools the heat sink and the probe to a temperature suitable for eye surgery and a portion of the gas is liquefied. This liquid evaporates to produce further cooling of the probe. After the chamber has been charged, the instrument is removed from the charging assembly and is ready for use by the surgeon.

A difficulty with the foregoing described instrument is that it must be held in an upright position until all of the liquid gas evaporated. This is not feasible because during an operation the surgeon often must put down the instrument to have both of his hands free. Thus, if the surgeon lays down the instrument on a tray or table in a horizontal position, the liquid will drain from the expansion chamber and be lost with the result that cooling of the probe will not be sustained for the required time.

SUMMARY OF THE INVENTION

Accordingly, an object of the present invention is to provide an improved cryogenic surgical apparatus of the foregoing type including an instrument which can be laid down or held in a horizontal position without the loss of liquefied gas.

Another object is to provide such an improvement which does not materially increase the weight or the cost of the instrument.

A further object is to provide such an improvement which is simple in construction and reliable in operation.

Other and further objects of the invention will be obvious upon an understanding of the illustrative embodiment about to be described, or will be indicated in the appended claims, and various advantages not referred to herein will occur to one skilled in the art upon employment of the invention in practice.

In accordance with the present invention, the foregoing objects are accomplished by providing cryogenic surgical apparatus including a surgical instrument and an assembly for charging the instrument with refrigerant, the instrument comprising an elongate tubular expansion chamber having a tip at its lower end and having an open upper end, a metal probe extending through the tip, and an imperforate annular wall at the open end of the expansion chamber defining a central opening for introducing gas under pressure into the chamber which expands and a portion thereof is liquefied within the expansion chamber, the opening being dimensioned and positioned so that the wall member prevents liquefied gas from draining through the opening when the instrument is in a horizontal position, the charging assembly comprising a source of refrigerant, valve means for dispensing refrigerant from the source, a tube in communication with the valve means for insertion into the opening in the instrument, and means independent of the tube for operating the valve means, the tube being of smaller diameter than the opening to permit gas to flow outwardly from the chamber while refrigerant is being dispensed into the chamber through the tube.

DESCRIPTION OF THE PREFERRED EMBODIMENT

Figure 1:
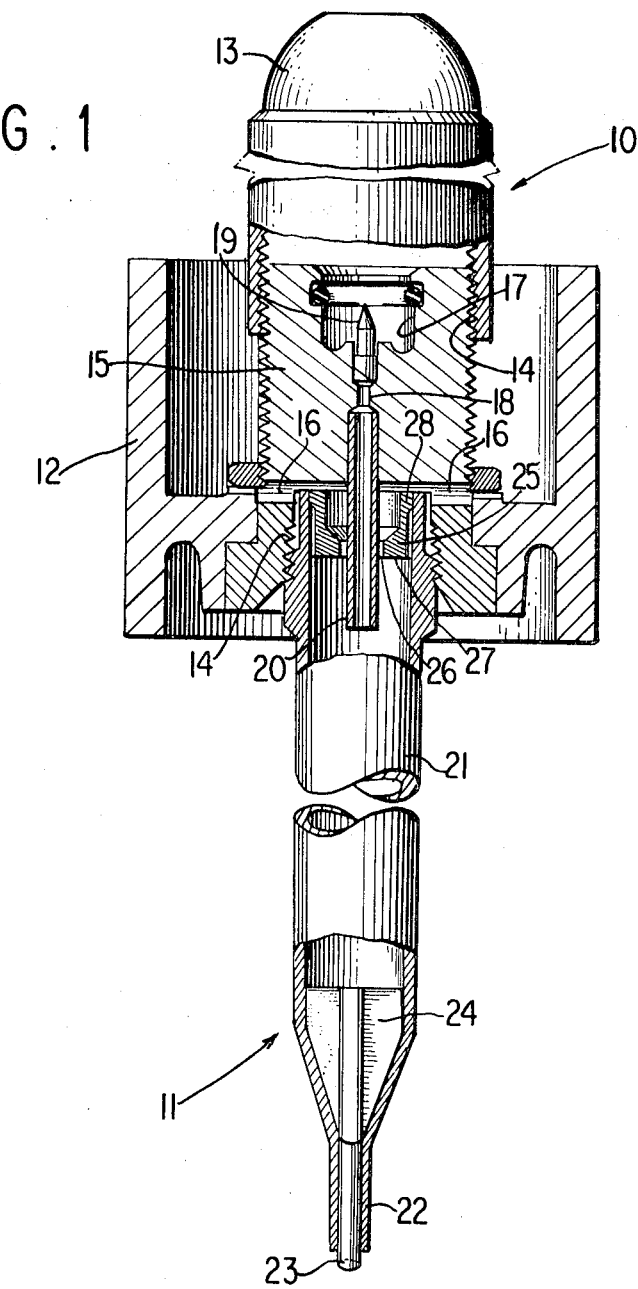
FIG. 1 is a fragmentary side view of the apparatus showing the instrument and the charging assembly partly in elevation and partly in section.

Referring now to FIG. 1 of the drawing in detail there is shown apparatus according to the present invention which includes a charging assembly 10 and a cryogenic surgical instrument 11.

The charging assembly 10 comprises a body 12 and cartridge holder 13. The body has a threaded bore 14 at its lower end and has an upright screw-threaded boss 15 formed with vents 16 which communicate with the bore 14. The upper end of the boss has a well 17 formed therein for the reception of the neck of a cartridge and has a passageway 18 extending downwardly from the well to the lower end of the boss. A hollow upwardly protruding piercing pin 19 is mounted in the upper end of the passageway 18 and a tube 20 is mounted in the lower end of the passageway which extends into upper end of the instrument 11 as described hereinafter. The cartridge holder 13 is screw threaded onto the boss and when screwed downwardly pushes the closure of the cartridge against the pin 19 to cause the closure to be pierced whereupon gas in the cartridge flows through the pin and the tube 20 and enters the instrument.

The instrument 11 comprises an elongate tubular body 21 which serves as an expansion chamber and which has a tip 22 at its lower end and is open at its upper end, a metal probe 23 extending outwardly through the tip, and a heat sink 24 on the probe and disposed within the expansion chamber. The upper end of the body 21 is screw threaded for removable attachment with the bore 14.

Figure 2:
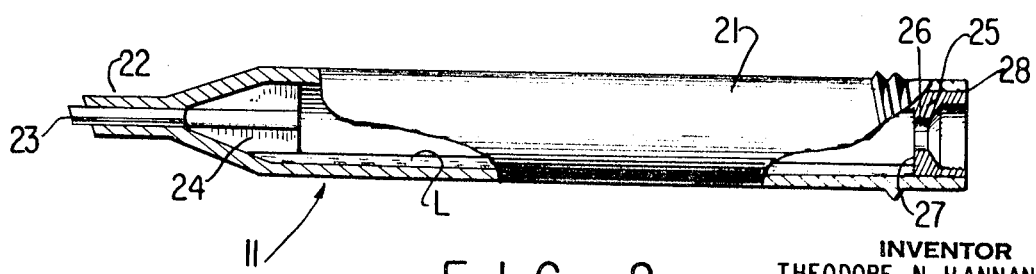
FIG. 2 is a longitudinal sectional view showing the instrument in a horizontal position and containing liquefied gas.

An insert 25 is fitted into the open upper end of the expansion chamber body 21. The insert is cup-shaped and has a central opening 26 in its bottom through which the tube 20 extends with clearance between it and the opening 26. The opening 26 is dimensioned so that an annular wall or baffle 27 is provided at the open end of the expansion chamber body 21 which is adequate to prevent liquefied gas from draining through the opening 26 when the instrument is in a horizontal position (FIG. 2). The insert has a yieldable annular zone 28 at its upper edge for forming a seal between the insert and the inner wall of the expansion chamber body 21.

In operation, a cartridge (not shown) containing a refrigerant gas is placed in the holder 13 and the instrument is attached to the body 12 of the charging assembly as shown in FIG. 1. The holder is screwed downwardly to cause the cartridge to be pierced by the pin 19 and to discharge its contents into the expansion chamber body 21. As the refrigerant gas expands it is cooled to a subzero temperature and a portion of the gas is liquefied. Excessive pressure is prevented from building up in the expansion chamber by reason of the clearance between the tube 20 and the insert opening 26 which communicates with the vents 16.

After the cartridge has been fully discharged, the instrument 11 is detached from the cartridge assembly 10 and is ready for use by the surgeon. Should the surgeon place the instrument in a horizontal position as shown in FIG. 2, liquid L within the instrument will not drain therefrom by reason of the baffle wall 27 which provides an elongate space of sector-shaped cross section having a volumetric capacity exceeding the maximum volume of liquid capable of being produced by a cartridge designed for use in conjunction with the instrument.

SUMMATION

From the foregoing description, it will be seen that the present invention provides an improved cryogenic surgical apparatus.

As various changes may be made in the form, construction and arrangement of the parts herein, without departing from the spirit and scope of the invention, and without sacrificing any of its advantages, it is to be understood that all matter herein is to be interpreted as illustrative and not in any limiting sense.

I claim:

1. Cryogenic apparatus including a surgical instrument and an assembly for charging the instrument with refrigerant, said instrument comprising an elongate tubular expansion chamber having a tip at its lower end and having an open upper end, a metal probe extending through said tip, and an annular wall member at the open end of said expansion chamber having a central opening, said central opening being provided for introducing gas under pressure into said chamber which expands and a portion thereof liquifies within said expansion chamber, said opening being dimensioned and positioned so that said wall member prevents liquefied gas from draining through said opening when the instrument is in a horizontal position; and said charging assembly comprising a source of refrigerant, valve means for dispensing refrigerant from said source, a tube in fluid flow communication with said valve means for insertion into said opening in said wall member instrument, and means independent of said tube for operating said valve means, said tube being of smaller diameter than said opening to permit gaseous fluid medium to flow outwardly from said chamber while refrigerant is being dispensed into said chamber through said tube, and said assembly includes a body having a bore at the lower end thereof which removably receives the open end of said instrument.

2. Apparatus according to claim 1, wherein said charging assembly includes at the upper end of said body connected to said bore by a passageway, said well being constructed to receive the neck of a cartridge of refrigerant having a sealed end, and piercing pin means in said well for piercing the sealed end of the cartridge, said tube being joined to said body to extend from said passageway into said bore to pass through said opening in said instrument when said instrument is positioned in said bore.

3. Apparatus according to claim 1 wherein said body is provided with venting passageway means in fluid flow communication with the top of said bore to permit gaseous fluid medium flowing outwardly from said chamber to vent to the atmosphere.

4. Apparatus according to claim 3 wherein said instrument and said bore are provided with cooperative means for releasably securing said instrument to said body.

5. Apparatus according to claim 2 including a cartridge-holding member threaded to said body for forcing the cartridge against said piercing pin means.

6. Apparatus according to claim 4 wherein said means for securing said instrument to said body includes cooperating screw threads on said instrument and in said bore.

* * * * *